Sept. 29, 1953 F. W. STORNER 2,653,717
STRAINER FOR COFFEE MAKERS
Filed Sept. 9, 1948 2 Sheets-Sheet 1
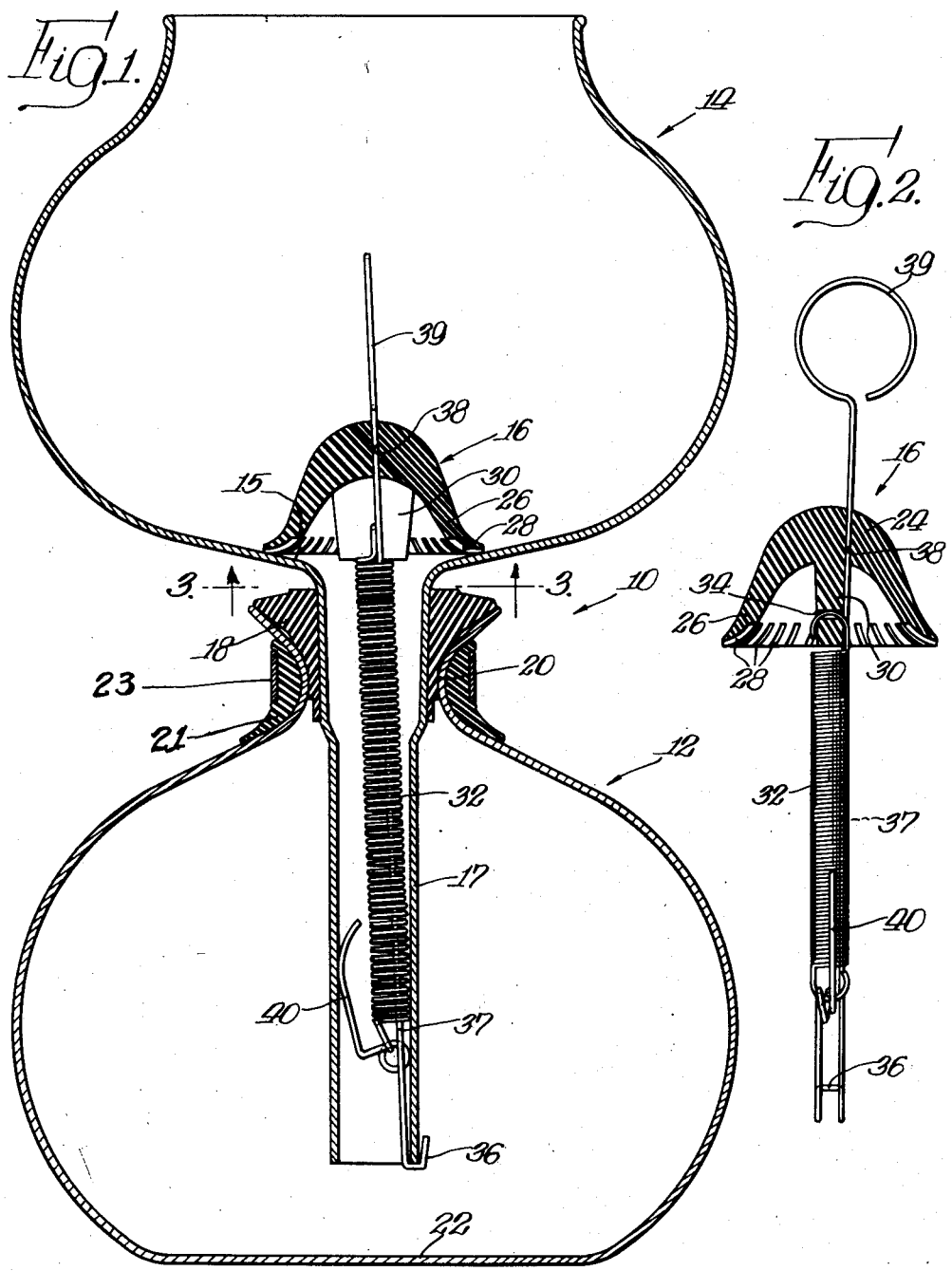
INVENTOR.
Frederick W. Storner,
BY Brown, Jackson,
Boettcher + Dienner
Atty's.

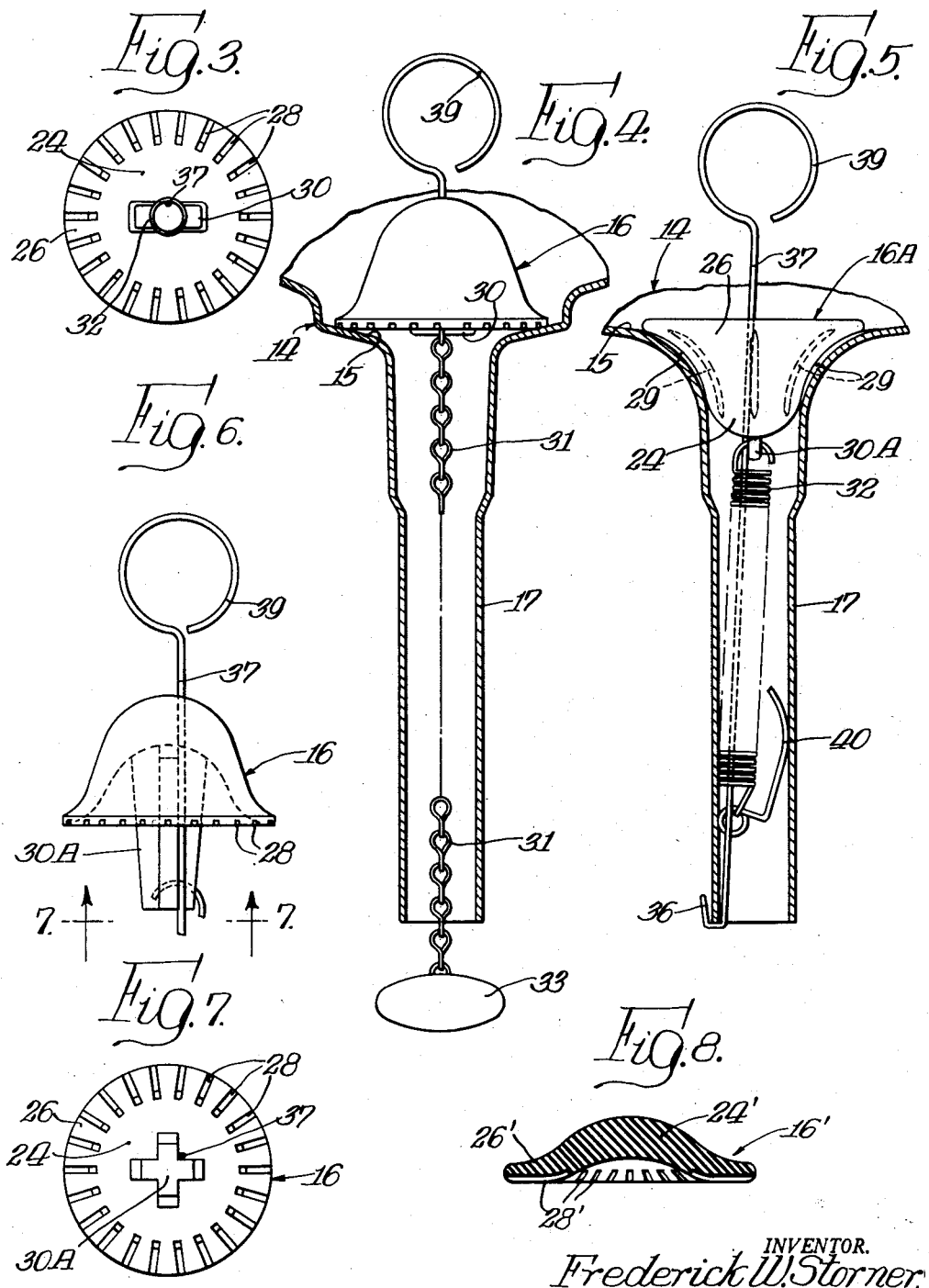

Patented Sept. 29, 1953

2,653,717

UNITED STATES PATENT OFFICE 2,653,717

STRAINER FOR COFFEE MAKERS

Frederick W. Storner, Chicago, Ill.

Application September 9, 1948, Serial No. 48,432

7 Claims. (Cl. 210—162)

My invention relates generally to a strainer or filter and more particularly to a strainer or filter for a coffee maker or the like.

A popular form of coffee maker presently being marketed and used comprises two vessels or receptacles, the lower one of which has a restricted pouring throat or neck and may serve as a coffee urn or flagon, the upper one of which has a large upper opening or throat and a downwardly extending spout or funnel which is adapted to be positioned in airtight relation in the throat of the lower vessel. Usually a gasket is employed between the outer wall of the spout of the upper vessel and the throat of the lower vessel to maintain an airtight junction, said gasket ordinarily being carried at the uppermost end of the spout. The spout or funnel extends downwardly into the lower vessel with its lowermost end being positioned slightly above the bottom wall of the lower vessel. A strainer or filter is generally disposed in the upper vessel at the entrance to the spout or funnel and some means is usually employed for retaining the strainer in position.

In use, such coffee maker has a quantity of water placed in the lower vessel corresponding to the amount of coffee which is desired whereupon the spout of the upper vessel is inserted into the lower vessel and an airtight junction is formed in the neck of the lower flask about the spout. At this time the spout extends down into the water in the lower vessel. In the upper vessel a quantity of ground coffee is disposed around or on top of the strainer or filter, the quantity used being governed by the amount of coffee which is to be made and the desired strength thereof. The coffee maker is then placed over a source of heat and the water is heated in the lower vessel and brought to a boiling temperature. As the water begins to boil, the vapor pressure in the top of the lower vessel causes the water to be pushed upwardly through the spout and through the strainer or filter into the upper vessel where the hot water mixes with the ground coffee, with a resulting coffee infusion. The water continues to be delivered through the spout into the upper vessel until such time as the amount of water in the lower vessel is insufficient to cover the lower end of the spout. At that time continued boiling merely results in the release of water vapor through the spout and up through the coffee infusion in the upper vessel. It is customary at such time to remove the coffee maker from the source of heat, whereupon the cooling of the flask and the vapor therein causes a contraction of the vapor and a resulting vacuum. The coffee in the upper vessel then flows back to the lower vessel through the strainer and spout. The strainer acts to strain out coffee grounds and to permit the passage of the liquid. When all of the liquid has returned to the lower vessel the upper one is removed and the lower one is used as a coffee urn or flagon, if it has a handle.

In devices of this type the strainers or filters have been a source of annoyance and dissatisfaction both because of their tendency to let coffee grounds pass into the lower vessel and also because of their tendency to clog, with the result that the coffee infusion fails to flow into the lower vessel. Removal of the strainer or filter to eliminate the clogging would, at such time, permit coffee grounds to flow into the lower vessel, an occurrence which would be highly unsatisfactory. To my knowledge none of the currently used types of filters consistently gives satisfactory results and it is a primary object of my invention to provide a strainer or filter which will uniformly provide satisfactory straining of the grounds from the coffee infusion without clogging.

One of the advantages of the strainer of my invention is that when the coffee grounds tend to clog the strainer, the strainer automatically eliminates the clogging action without any attention by the user. The construction of the strainer of my invention is such that when it tends to become clogged from coffee grounds blocking the passageways which it defines between the upper vessel and the spout, the pressure exerted on the strainer by reason of the existence of vacuum in the lower vessel is such that the margin of the strainer is flexed sufficiently to shift the coffee grounds from their clogging or blocking position. Such action takes place automatically and may occur at any time, to varying extents, depending upon the amount of blockage.

It is a further object of my invention to provide a strainer at least a portion of which is formed of a flexible resilient elastic material and able to withstand hard usage without damage. Some of the strainers or filters currently in use are formed of porcelain or glass and are easily damaged.

It is yet another advantage of my invention that the means for retaining the strainer in position is simple but effective and may be easily manipulated from that side of the strainer at which the ground coffee is disposed.

Another advantage of the strainer of my invention is that it may be easily cleaned and sterilized and used for long periods of time. Many forms of strainers presently on the market must be discarded after a short period of use, sometimes after a single use.

Although the strainer is particularly well adapted for use in a so-called "pressure coffee maker," such as that just referred to, it is adapted for use in other devices of a like nature and may also be employed even when pressure is not so produced in the system to be filtered. In such instances the filter may be flexed by hand or by some mechanical implement.

Other objects, uses and advantages of my invention will become apparent from the following description when taken with the accompanying drawings in which:

Figure 1 is a vertical sectional view, with portions being shown in elevation, of the strainer of my invention disposed in a pressure coffee maker;

Figure 2 is a vertical sectional view of the strainer of Figure 1, the section being on a plane at a 90° angle from that of Figure 1 and showing only the strainer;

Figure 3 is a plan view of the device of Figures 1 and 2 looking in the direction of the arrows 3—3 of Figure 1;

Figure 4 shows the strainer of my invention with a modified form of retaining means;

Figure 5 shows a strainer of modified form which is adapted to cooperate with a coffee maker having grooves disposed in the upper vessel at the entrance to the spout;

Figure 6 shows a modified form of strainer of my invention having guide means for locating the strainer in its operating position;

Figure 7 is a plan view looking in the direction of the arrows 7—7 of Figure 6; and Figure 8 is a view of yet another modified form of strainer.

Referring now to Figures 1, 2 and 3 of the drawings there will be seen a "pressure coffee maker," indicated generally by the reference numeral 10, comprising, in the main, a coffee flagon or urn 12, which is the lower vessel of the two vertically aligned vessels; a bowl 14 which is the upper vessel in which ground coffee is disposed; and a strainer 16 which is disposed in the bowl 14 on a supporting wall or surface 15 about the entrance to the down spout or funnel 17, which spout extends through a gasket 18 in the neck or throat 20 of the urn 12 and into the lower portion of the urn to a position slightly above its bottom wall 22. The urn 12 and bowl 14 may be made of glass, metal or other suitable materials or combinations of materials. The gasket 18 is usually carried about the spout at its uppermost portion and is adapted to fit within the neck 20 of the urn 12 in order to provide an air tight fit between the neck and spout. Around the neck 20 is positioned a gasket 21 in a peripheral groove of which a clamping ring 23 which is adapted to be connected with a handle (not shown).

The purpose of the strainer 16 is to permit the passage of fluids between the spout 17 and the bowl or upper vessel 14 without permitting ground coffee or other solid matter to pass from the bowl portion to the spout. The operation of the strainer will be set forth more fully hereinafter.

The filter 16 comprises a generally bell-shaped member having a central body portion 24 which is domed and a downwardly and outwardly extending margin 26 the under surface of which margin has a plurality of generally radially extending grooves 28. The strainer 16 in its preferred form is composed of a flexible, resilient elastic material, such as rubber or similar plastics, although it is possible to have the central body portion 24 of a material which is not flexible or resilient, so long as the margin in such strainer is elastic, flexible and resilient. Integrally formed with the strainer 16 and extending downwardly from the central body portion 24 is a tongue 30 which is adapted to provide a means for connecting to the strainer a coiled spring 32, the upper end of said spring passing through a hole or aperture 34 in the tongue 30. The lower end of the spring 32 is connected with a hook or connecting member 36, said hook, in the preferred form, being formed of wire and having one leg which extends upwardly through the coiled spring 32 and through a passageway 38 in the central dome shaped portion 24 of the strainer 16. It will be understood that the hook 36 could be connected with a rod, comparable to the wire 37, and that the rod could then pass through the passageway 38 in the strainer 16 to a position on the upper side of said strainer. As shown, the hook 36 and wire 37 are integral and the wire at its upper end provides a loop 39 which may be engaged by a finger, or fingers, of the user. There will also be seen a resilient guide means 40 for the hook 36 which guide means serves to urge the hook 36 against the inner wall of the down spout 17 so that the user will have no difficulty, when inserting the hook and spring in the spout, in engaging the hook 36 over the lower end of the spout 17.

In order more easily to describe the operation of the strainer, the procedure for making the coffee in the illustrated pressure coffee maker 10 will be briefly set forth. With the upper and lower vessels 14 and 12, respectively, separated, water will be placed in the urn, or lower vessel, 12 to a level somewhat below the neck 20. The user will then take the strainer 16 in one hand and the bowl, or upper vessel, 14 in the other hand and insert the hook 36 and spring 32 in the spout 17 of said vessel. When the strainer 16 is disposed on the supporting surface or bottom wall 15 of the bowl 14 about the entrance to the spout 17, the user will then depress the wire or rod 37 by means of the looped portion 39 against the action of the spring 32 with the result that the hook 36 will travel to the end of the spout 17. The guide member 40 for the hook 36 will cause it to engage the inner side wall of the spout 17 until it reaches the lower end of said spout, whereupon the resilient guide means 40 will cause the hook 36 to snap outwardly and over the lower end of the spout. Then when the user releases the pressure on the wire or rod 37 the hook 36 will move upwardly and engage the end of the spout so that the strainer will be resiliently retained on the supporting surface 15 of bowl 14. Coffee in ground form is then placed in the bowl 14 around the filter 16 in sufficient quantity to make an appropriate amount of coffee of desired strength and the bowl 14, with the gasket 18 surrounding the upper portion of the spout 17, is then inserted through the neck 20 of the lower vessel or urn 12, until an air tight fit of the gasket relative to the spout and the neck is obtained.

The coffee maker 10 is then taken by its handle and set over a source of heat in order to cause the water in the urn 12 to boil. At this time it will be observed that the only outlet from inside the urn 12 to atmosphere is through the spout 17 the lower end of which is submerged in the water which is boiling in the urn. Consequently, as boiling commences, pressure develops within the urn 12 and acts upon the surface of the water to force it downwardly in the urn and upwardly through the spout 17 and through the grooves 28 in the strainer 16 and thence to the ground coffee in the bowl 14. The bowl 14 is of such capacity that it will accommodate all of the water which may be forced upwardly through the spout 17. When the level of the boiling water in the urn 12 is below the lower end of spout 17, water will no longer be forced up the spout but instead vapor at greater than atmospheric pressure will rise up the spout and pass through the strainer and liquid which is now in the upper vessel or bowl 14. When the hot water passes through the strainer to the ground coffee a coffee infusion results. At such time as the water in the urn has reached a level just below the spout 17 the coffee maker may be removed from the source of heat to permit the urn 12 and its contents to cool. The cooling causes a contraction of the gases or vapors within the urn 12 and a vacuum thereby results. Air pressure then acts on the surface of the coffee infusion in the bowl 14 and causes it to run down the spout 17 into the urn 12. As the liquid passes from the bowl 14 to its spout 17 the ground coffee and other solid matter is strained by the strainer 16.

If, at this time, the strainer becomes clogged for any reason the existence of vacuum in the urn 12 and the consequent pressure tending to force the liquid in the bowl 14 into the urn 12 will act on the strainer 16 to cause the flexible resilient elastic margin to be flexed a slight amount. The very slight flexing of the margin which contains the grooves 28 will break the clogging action so that the coffee infusion will continue to pass through the strainer and down the spout 17 into the urn 12. As will be readily understood the strainer 16 remains positioned on the supporting surface 15 about the entrance to spout 17 during passage of the liquid either upwardly or downwardly by reason of the resilient biasing means 32 and hook 36.

When all of the liquid in the upper vessel or bowl 14 has run into the urn 12, the upper vessel 14 is removed, along with the gasket 18, from the lower vessel and the lower vessel then serves as an urn or flagon for directly serving the coffee. The coffee grounds in the bowl 14 may then be removed therefrom and the strainer may be removed for cleaning and for storage by depressing the rod or wire 37 by the loop 39 and manipulating it sideways sufficiently to disengage the hook 36 from the lower end of the spout 17, whereupon the hook, spring and strainer may be released from the spout 17 and bowl 14.

In Figure 4 there is shown a modified means for retaining the strainer 16 upon the supporting surface 15 in the bowl 14, said means comprising a chain 31 connected to the tongue 30 of the strainer with a weight 33 connected at the lower end of the chain. The dimensions of the weight are such that it must be rotated from its free hanging position to have its longer axis parallel to the axis of the spout 17 of bowl 14 before the weight can be passed through said spout to release the strainer 16 from the bowl. This modification serves to illustrate that more than one means may be employed for seating the strainer within the bowl 14 about the entrance to the spout 17. The loop 39 associated with the strainer 16 is employed for more easily manipulating the same.

Although the passageways 28 in the strainer 16 are shown in the form of grooves in the underside of the margin 26 in the devices of Figures 1 through 4, it will be appreciated that in place of the grooves there may be employed circular passageways, or passageways of other cross-sectional shape or outline, which are not open on their undersides but instead pass radially inwardly from the outer edge of the margin 26 toward the central axis of the strainer. Furthermore, if desired, circular passageways through the margin could be located at a higher level, that is, nearer the central body portion and might even be disposed in the central body portion itself. Preferably, however, the passageways in the strainer should be in the margin and should be formed as grooves so that the passageways are defined by the grooves and the adjacent supporting surface comprising the bottom wall 15 of the bowl 14.

Referring to Figure 5 of the drawings there will be seen a strainer 16A which is bell shaped and which is employed in inverted form and has its smooth exterior wall resting over grooves 29 which are formed in the vessel 14 at the entrance to the spout 17. Fluid is adapted to pass through the grooves 29 in the vessel 14 from the bowl to the spout or vice versa. If clogging should occur around the periphery of the strainer at the grooves 29, pressure on the strainer 16A in a direction toward the lower vessel (not shown) will cause the flexible resilient margin 29 to flex sufficiently to break the clogging action of any solid matter such as coffee grains which have accumulated and blocked the flow of liquid to the grooves 29. Resilient retaining means such as that illustrated in Figures 1 and 2 is employed for maintaining the strainer 16A in position about the entrance to the spout 17, said resilient means being connected with a tongue 30A which extends downwardly from the domed central body portion 24 of the strainer 16A. The resilient retaining means may be manipulated in the same fashion as that described above with respect to the device of Figures 1 and 2.

The modified form of strainer illustrated in Figures 6 and 7 is similar in most respects to the strainer illustrated in Figures 1, 2 and 3 except that in place of the tongue 30 of the devices of Figures 1, 2 and 3 there is employed a tapered guide, cross-shaped in cross section, which serves not only as a means for connecting the strainer 16 with the resilient retaining means but also as a guide for centering the strainer 16 with respect to the spout of the upper vessel 14. The wire 37 and its loop 39 are adapted to manipulate the resilient retaining means in the same fashion as described above with respect to Figures 1 and 2.

In Figure 8 is shown a modified form of strainer 16' which is generally flatter and less bell shaped than the devices described above and has a central body portion 24' and flexible resilient margin 26' with a plurality of grooves 28' extending radially from the outer edge of the margin toward the central axis of the strainer. From this modified form of the invention it will be seen that the essential characteristic of the strainer is its flexible resilient margin which may be flexed when pressure is applied to the strainer. The flexing action of the margin, particularly at its outer edge, is readily achieved by having the central body portion somewhat domed or arched, and with the margin outwardly turned since pressure at the central body portion will then tend to direct the margin radially outwardly and turn its outer edge up a slight amount. As the rate of flow through the strainer is varied by the tendency of the coffee grounds to cause a blocking action, variations in pressure on the strainer are produced so that there may be a slight flexing action going on throughout the entire period when the coffee infusion is running from the upper vessel into the lower vessel. Such action is automatic and therefore provides a strainer which is self-clearing.

It will be observed that the various forms of strainer illustrated and described above are all made of a flexible, resilient elastic material which is impervious to liquids but it will be understood that it is sufficient if the margin alone is elastic, flexible and resilient. The fact that the central body portion of each of the forms of strainer illustrated and described above is of greater cross section than the margin is for the purpose of maintaining the shape of the strainer and preventing it from becoming inverted due to pressure. It will be readily understood that if the central body portion is not itself flexible and resilient but is, instead, substantially rigid, or if it is made of a different type of flexible resilient material, the thickness of the central body portion could be modified.

Although I have illustrated and described preferred embodiments of my invention it will be appreciated that variations may be made therein by those skilled in the art, in view of my disclosure, and, consequently, I do not intend to be limited to the preferred forms except as the appended claims are so limited.

I claim:

1. A strainer for a vacuum type coffee maker having a bowl with a depending axial spout comprising an imperforate dome shaped body thicker at the center than at its margin, said body having a concave undersurface terminating in a margin provided with outwardly extending channel-like passages, said body being formed of an elastic material whereby the flexibility and resiliency increase along the radius of the body, said body in response to vacuum pressure exerted on its underside changing its shape to increase its peripheral dimension at the margin thereby to change the shape of said passages to prevent clogging of said strainer.

2. The strainer of claim 1 wherein the elastic margin of the strainer is grooved on the side which is disposed against the supporting surface with the grooves being of a size to permit the passage of fluids therethrough and to strain out solid matter.

3. The strainer of claim 1 wherein the strainer is an integral domed elastic member thicker at its central body portion than at its margin.

4. A vacuum type coffee maker strainer adapted to be disposed on a generally flat supporting surface at the entrance to a passageway, said strainer comprising an integral member having an imperforate generally rigid central body portion and a flexible resilient margin of decreasing thickness provided with passageways on the underside extending inwardly from the periphery of said margin, said margin changing the shape of said passageways in response to vacuum pressure exerted on the body portions and a resilient means adapted to seat and to retain said flexible resilient margin against said supporting surface.

5. A vacuum type coffee maker strainer adapted to be disposed on a generally flat supporting surface about the entrance to a passageway, said strainer comprising an imperforate member having a central body portion and a flexible resilient elastic margin, said margin having passageways therethrough from the edge to the under surface, said margin being adapted to engage said supporting surface about the entrance to said passageway and being adapted to move radially thereover in response to pressure exerted on the strainer toward the supporting surface during the straining action when clogging of the strainer occurs, such radial movement thereby automatically overcoming the clogged condition by changing the shape of said passageways.

6. A vacuum type coffee maker strainer adapted to be disposed on a generally flat supporting surface of a bowl about the entrance to a passageway, said strainer comprising a member having a central imperforate body portion and a flexible resilient elastic margin, said margin being grooved on the side which is disposed against the supporting surface with the grooves being of a size to permit the passage of fluids therethrough and to strain out solid matter, said margin being adapted to move radially over said supporting surface in response to pressure exerted on the strainer toward the supporting surface during the straining action when clogging of the strainer occurs, such radial movement thereby automatically overcoming the clogged condition by changing the shape of said grooves.

7. The strainer mechanism for a vacuum type coffee maker which includes a bowl having a generally flat supporting surface about the entrance to a depending spout, said strainer mechanism comprising an integral member having an imperforate central body portion and a flexible resilient elastic margin, said elastic margin being provided with channel passageways adapted to permit the passage of fluids and to strain out solid matter, said margin being adapted to engage said supporting surface about the entrance to the spout and being adapted to move radially thereover in response to pressure exerted on the strainer toward the supporting surface during the straining action when clogging of the strainer would occur, such radial movement thereby automatically overcoming the clogging action.

FREDERICK W. STORNER.

References Cited in the file of this patent

UNITED STATES PATENTS

| Number | Name | Date |
|---|---|---|
| 1,929,605 | Perlman | Oct. 10, 1933 |
| 2,269,956 | Renner | Jan. 13, 1942 |
| 2,274,607 | Cohen | Feb. 24, 1942 |
| 2,325,452 | Weeks | July 27, 1943 |
| 2,370,674 | Lucia | Mar. 6, 1945 |
| 2,449,620 | Reichold | Sept. 21, 1948 |
| 2,464,843 | Becher | Mar. 22, 1949 |
| 2,483,104 | Reichold | Sept. 27, 1949 |
| 2,506,013 | Columbus | May 2, 1950 |